H. J. BITTAKER.
EXPANSIBLE CORE FOR VULCANIZING TIRES.
APPLICATION FILED MAY 6, 1920.

1,407,718.  Patented Feb. 28, 1922.

INVENTOR
Harvey J. Bittaker
BY G. H. Ely
ATTORNEY

UNITED STATES PATENT OFFICE.

HARVEY J. BITTAKER, OF AKRON, OHIO, ASSIGNOR TO THE FIRESTONE TIRE AND RUBBER COMPANY, OF AKRON, OHIO, A CORPORATION OF OHIO.

EXPANSIBLE CORE FOR VULCANIZING TIRES.

1,407,718.   Specification of Letters Patent.   Patented Feb. 28, 1922.

Application filed May 6, 1920. Serial No. 379,306.

*To all whom it may concern:*

Be it known that I, HARVEY J. BITTAKER, a citizen of the United States, residing at Akron, in the county of Summit and State of Ohio, have invented certain new and useful Improvements in Expansible Cores for Vulcanizing Tires, of which the following is a specification.

In the art of vulcanizing rubber tires it has long been a practice to vulcanize tires while they are expanded by means of internal pressure, with water, air, or steam. For this purpose the pressure medium has either been introduced directly into the tire casing, or into a flexible and expansible core placed inside the casing. It is with improvements in the construction of these expansible bags that this invention has to do, and by use of this improved expansible bag superior results are obtainable.

In the use of these expansible bags, due to the inserting and removal of the bag from the tire casing, the walls are subjected to considerable bending. On account of this frequent bending and the additional fact that the bags become hard and overcured through continual heating they have a comparatively short life.

An object of my invention is to construct a bag that will not crack when the bag has been used for a considerable number of heats, and which will not become hardened as rapidly as bags now in general use.

My invention resides in constructing a bag or core of the usual shape, which is made of layers of rubber and frictioned fabric. At the outer circumference and extending about half way down each side, or further, if desired, the bag is made of two separate layers that meet at the inner circumferential portion to form the inner edge of the core.

A further object is to build the bag of layers of rubber and friction fabric having an outer layer of fabric that is frictioned or coated on the inner side only. The bare fabric outer cover has been found to prevent the migration of sulphur and other deteriorating substances from the tire carcass to the bag as happens if the outer surface is rubber. The rubber absorbs the sulphur which helps to lessen the life of the bag. It also tends to make the bag hard and inelastic.

Another object of my invention is the provision of an expansible core that will be more pliable and easily bent to permit insertion within the tire or removal therefrom.

These and other objects will more fully appear from the following description and the accompanying drawings and will be especially pointed out in the claims.

The tire mold may be of any well kown or approved construction and consists of the two parts 1 and 2 hollowed out to afford the mold cavity 3. In the upper part of the cavity of each mold is received a suitable tread forming ring 4. 5 indicates the usual compression rings at the inner part of each mold. In the form shown, the compression rings are shaped to form a tire of the clincher type, but they may be changed to straight side tire forming rings if desired. The expansible bag or core designated by numeral 6 is inflated by the usual valve stem 7$^a$.

Figure 1:
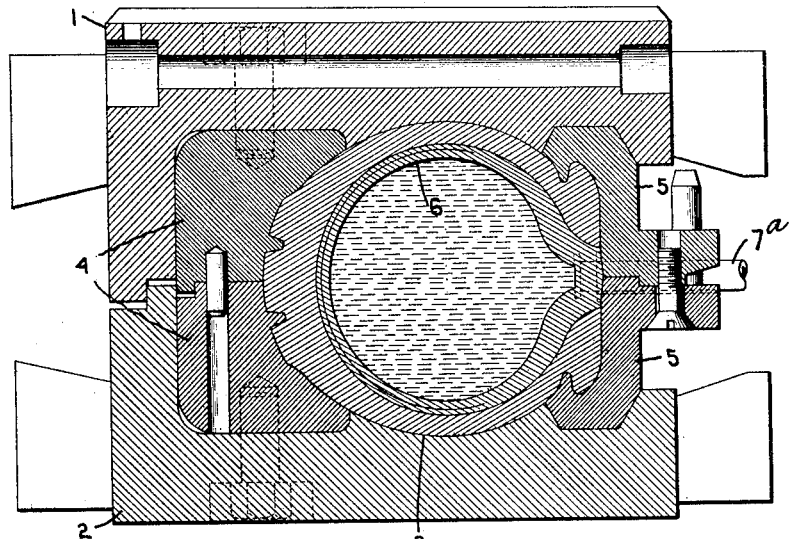
Fig. 1 is a cross sectional view through a tire mold showing my improved air bag in position for the curing of the tire.
Figure 2:
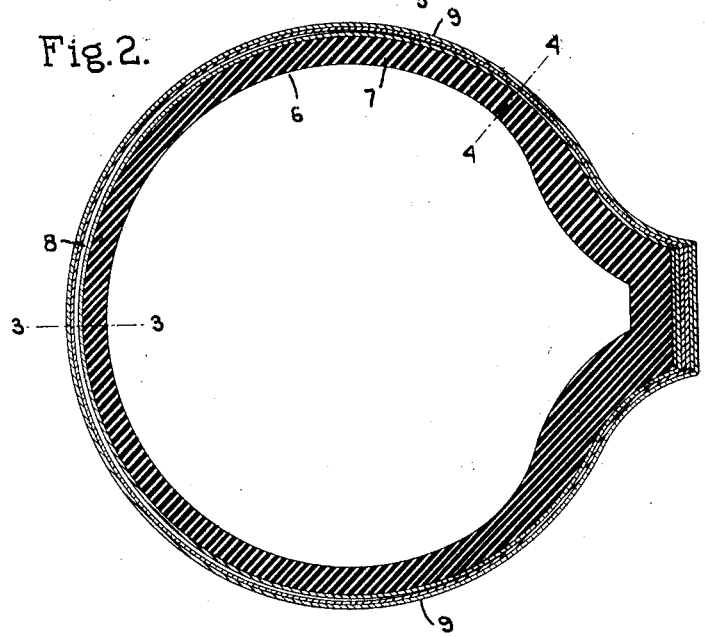
Fig. 2 is an enlarged cross section of the bag showing the method of construction.
Figure 4:
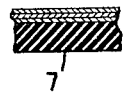
Fig. 4 is a view on line 4—4, Fig. 2.
Figure 3:
Fig. 3 is a view on line 3—3, Fig. 2.

Referring now particularly to Figs. 2 to 4. The construction of the bag 6 is shown in detail. In building up the bag there is first formed a heavy inner layer or lining of rubber 7. Over this inner layer is then placed a plurality of layers of rubberized fabric and rubber. It has been the custom to vulcanize all these layers together which form a thick wall. Because of the many cures a bag receives they become hard and when bent they crack open and are rendered useless. My invention provides a space 8 between a number of the outermost layers and the layers forming the inner portion of the bag. This space extends around the entire tread portion of the bag and may be of any desired length transversely. It has been found from practice that it is sufficient to extend it approximately half way down each side 9 of the bag 6 toward the bead. In the making of these bags a coating of soapstone is spread upon the layer that will eventually become the bottom of the space 8, the soapstone being spread only as far around each side as it is desired to have the space extend. The outer layers of frictioned fabric are then placed on the core, and when vulcanized the layers having the soapstone between them do not unite.

It will be seen that because the bag is made of two or more layers it will be more pliable and consequently the life of the bag will be lengthened. From a series of tests it was found that this improved type of bag will outlast two of the ordinary type.

I propose to construct the bag 6 of layers of fabric and rubber, and have the outer layer consist of fabric that is coated or frictioned on one side only, known as "bare back." The bare, or uncoated, surface is placed outwardly, thus making a bag which has a fabric outer surface. The fabric is intended to prevent the migration of sulphur or other deteriorating substances from the tire carcass to the rubber in the bag. It should also be noted that the exterior of the bag presents a smooth surface throughout by which the formation of objectionable ridges or depressions in the interior of the tire is avoided. Where such ridges are formed in a tire, the life of the inner tube in service is shortened.

The outer layer or layers comprising the outer section may be of closely woven fabric, which is practically non-stretchable. With such a construction the bag is very pliant and will expand only to the desired size.

The foregoing detailed description has been given for clearness of understanding only and no unnecessary limitation should be understood therefrom. Changes may be made in form and construction without departing from the spirit of the invention within the scope of the appended claims.

I claim:

1. In an apparatus for vulcanizing tires under internal pressure, an expansible core for insertion in the tire, said core having a smooth external surface, a pluralty of fabric layers in said core, said layers being united near the beads, but separated at the tread portion of the bag.

2. In an apparatus for vulcanizing tires under internal pressure, an expansible core adapted to be received within the tire, and a layer of fabric extending entirely around the core, said layer being separate from the remainder of the bag at the tread, but attached to the bag at the edge thereof.

3. In an apparatus for vulcanizing tires under internal pressure, a flexible core adapted to be received within the tire, said core being composed of rubber and fabric, said fabric being on the outside of the core and separate from the tread portion but joined to the bag at both lower edges.

4. In an apparatus for vulcanizing tires under internal pressure, a core adapted to be inserted within the tire, a flexible layer externally of the core, said layer being joined to the body of the core at the edges, but separate at the tread portion.

5. An expansible core comprising rubber and fabric, the outermost layer being formed of fabric without an external coat of rubber.

6. An expansible core comprising rubber and fabric, the outermost layer being formed of fabric without an external coat of rubber and being unattached to the body of the core at its tread portion.

7. An expansible core comprising rubber and fabric, the outermost layer being formed of fabric without an external coat of rubber and being attached to the edge of the bag but unattached to the body of the core at its tread portion.

8. A flexible and expansible core, comprising a layer of rubber and a layer of fabric vulcanized thereto, and a cover layer of fabric over the core and secured to the edges only by vulcanization.

9. A flexible and expansible core, comprising a layer of rubber and a layer of fabric vulcanized thereto, and a cover layer of "bare-back" fabric over the core and secured to the edges only by vulcanization.

10. A flexible and expansible core, comprising a layer of rubber and a layer of fabric vulcanized thereto, and a cover layer of "bare-back" fabric extending over the entire surface of the core and attached thereto by vulcanization.

HARVEY J. BITTAKER.